Dec. 17, 1935.  H. R. ROSENBERRY  2,024,537

CLAMPING DEVICE FOR INDIVIDUAL WHEEL SUSPENSION UNITS

Filed Jan. 19, 1935

INVENTOR
HOMER R. ROSENBERRY
BY
Brockett, Hyde, Higley & Meyer
ATTORNEYS

Patented Dec. 17, 1935

2,024,537

UNITED STATES PATENT OFFICE 2,024,537

CLAMPING DEVICE FOR INDIVIDUAL WHEEL SUSPENSION UNITS

Homer R. Rosenberry, Euclid, Ohio, assignor to The Simmons Manufacturing Company, Cleveland, Ohio, a corporation of Ohio Application January 19, 1935, Serial No. 2,607

9 Claims. (Cl. 280—150)

This invention relates to a clamping device for an individual wheel suspension unit of the type disclosed in the Dubonnet Patent No. 1,916,098, granted June 27, 1933, the function of said clamping device being to prevent the approximately eight inch drop of the associated wheel when the support for said unit is elevated, to change said wheel or the tire thereon, for example, and thus avoid the need of a special jack having an abnormally great elevating range.

The general object of the present invention is the provision of a simple and inexpensive clamping device for effectively performing the aforesaid function, said clamping device being of light weight, of compact form and of a convenient size for handling.

Figure 1:
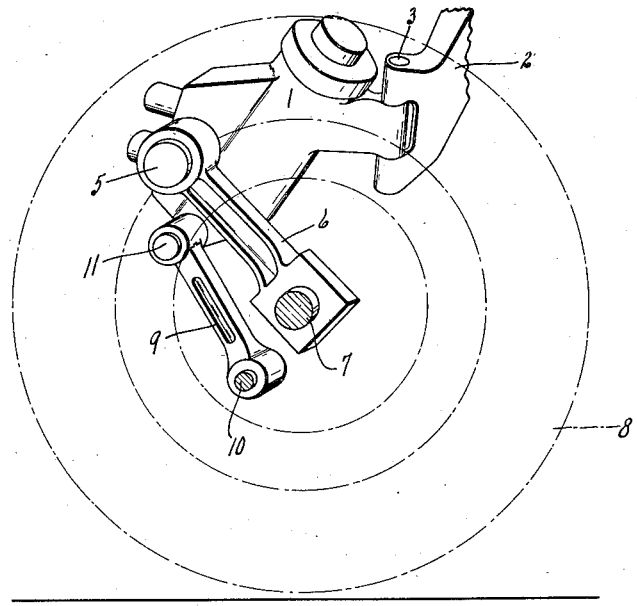
Figure 2:
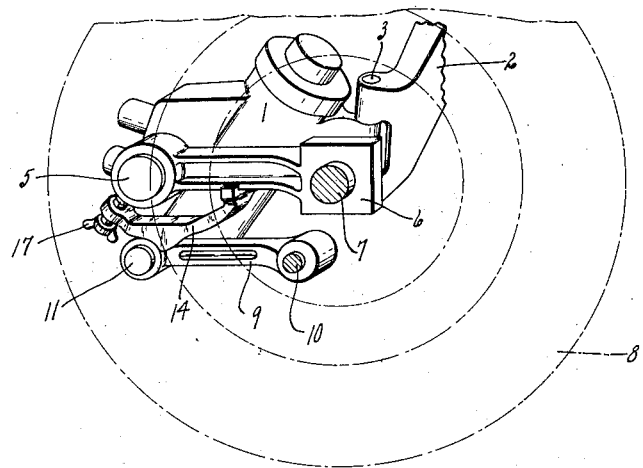
Figure 3:
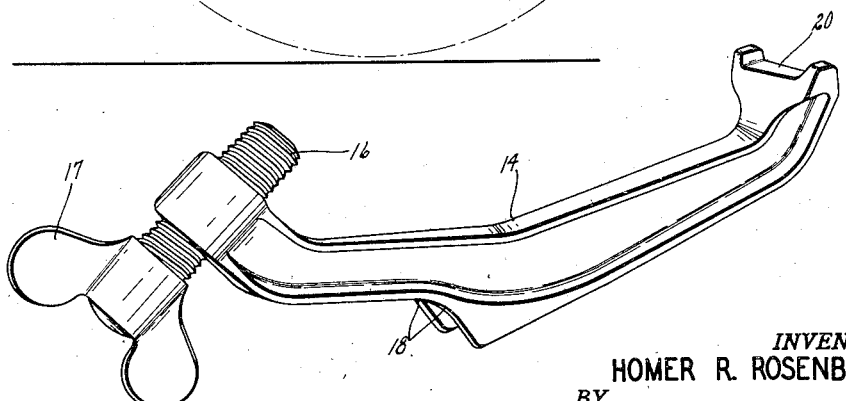

Further features of said clamping device will appear from the following description thereof, reference being had to the accompanying drawing in which Fig. 1 is a perspective view of said Dubonnet type individual suspension unit for the left front wheel of an automobile, said view showing the drop of said wheel when the automobile frame carrying said unit is elevated; Fig. 2 is a similar view showing the use of the present clamping device in preventing such drop of said wheel; and Fig. 3 is a perspective view of said clamping device.

So far as description is here necessary, an individual wheel suspension unit of the Dubonnet type comprises a suitable housing 1 for the shock-absorbing springs, etc., said housing being pivotally mounted, for substantially horizontal swinging movement, on the frame 2 of an automobile by means of a king pin 3. Pivotally mounted on a horizontally disposed splined shaft 5 carried by said spring housing is the front end of an arm 6, the rear end of which is provided with an outwardly extending spindle 7 on which the left front wheel 8 of the automobile is rotatably mounted. In order to permit said wheel to have translational movement straight up and down only, and to maintain the brake flange plate and brake assembly of the wheel in proper position, a radius rod or bracing arm 9 is provided, said arm having its rear end pivotally connected to a bearing 10 on said brake flange plate and its front end pivotally connected to a bearing 11 on the spring housing 1.

The wheel 8 is thus free to independently rise and fall, on the floating rear ends of the arms 6 and 9, in accordance with the condition of the road over which the wheel is travelling.

When the automobile frame which carries said wheel suspension unit is jacked up or elevated, to permit said wheel or the tire thereon to be changed, for example, the approximately eight inch drop of said wheel, as shown in Fig. 1, makes it necessary to jack up or elevate said frame approximately seventeen inches, an elevation beyond the range of the standard or ordinary automobile jack. A special jack having an abnormally great elevating range or supporting blocks for the standard jack is therefore necessary, a requirement which may cause, on occasion, considerable inconvenience and embarrassment.

To prevent such drop of said wheel, upon such elevation of said automobile frame, is the function of the present clamping device, a function which said device performs in a particularly convenient and effective manner.

In the embodiment of the invention here illustrated, said clamping device is in the form of a simple metal bar or lever 14, of such size and of such shape that it can be conveniently positioned between the wheel-supporting arm 6 and the bracing arm 9 of the wheel suspension unit when said arms are in their normal, generally parallel relationship and in their normal, generally horizontal position, a relationship and a position possessed by said arms prior to any elevation of said automobile frame and hence prior to any drop of said wheel.

As indicated in Fig. 2, said clamping bar or lever 14 is so positioned between the arms 6 and 9 of the wheel suspension unit that the intermediate portion of said bar or lever rests upon the fixed front end of the lower arm 9. With said arm front end serving as a fulcrum or pivot, said clamping bar or lever is swung in a counter-clockwise direction thereon so as to cause its rear end to move upwardly into supporting engagement with an intermediate portion of the upper, wheel-supporting arm 6.

To enable the rear end of said clamping bar or lever to engage said wheel-supporting arm with sufficient upward pressure to prevent downward or clockwise movement of said arm, with a consequent dropping of the wheel 8 supported thereby, the front end of said bar or lever is provided with an adjustable pressure screw 16, the head 17 of which is of wing form for convenient manipulation. By adjusting said screw into forcible engagement with the fixed front end of the wheel-supporting arm 6, sufficient resistance can be applied to the front end of said clamping bar or lever to enable its rear end to prevent any clockwise, wheel-dropping movement of said wheel-supporting arm, said bar or lever operating as a lever of the first class.

For convenient positioning of said clamping bar or lever between the arms 6 and 9 of the wheel suspension unit, in accomplishing the aforesaid wheel-supporting or wheel-clamping function, the intermediate portion of said bar or lever which rests upon the fulcrum-forming fixed front end of the lower, bracing arm 9 is provided with a generally concave seat 18 to securely receive said arm end, and the rear end of said bar or lever is provided with a suitable notch 20 to securely receive the upper, wheel-supporting arm 6. For more efficient application of pressure or power, the fulcrum-engaging seat 18 of the clamping bar or lever is preferably located nearer the front end of said bar or lever than it is to the rear end thereof, as shown.

While it is believed that the nature and advantages of the present invention will be readily apparent from the foregoing description thereof, it is to be understood that said invention is not limited to what is here shown or described but includes all such changes that come within the scope of what is claimed.

I claim:

1. In combination with an individual wheel suspension unit of the type provided with a pivoted wheel-carrying arm having clockwise movement, with consequent dropping of said wheel, about its pivot upon elevation thereof, of a clamping device for preventing such arm movement and hence such wheel drop, said device comprising a lever adapted to be supported intermediate its ends on said suspension unit and to have its rear end supportingly engage from below said wheel-carrying arm by downward pressure applied to the front end of said lever.

2. The combination set forth in claim 1, characterized in that said downward pressure is applied by means interposed between said lever front end and said suspension unit.

3. The combination set forth in claim 1, characterized in that said downward pressure is applied by means adjustably mounted on said lever front end and interposed between said end and said suspension unit.

4. The combination set forth in claim 1, characterized in that said downward pressure is applied by a pressure screw adjustably interposed between said lever front end and said suspension unit.

5. The combination set forth in claim 1, characterized in that said downward pressure is applied by a screw adjustably mounted on said lever front end and forcibly engaging the pivoted portion of said wheel-carrying arm.

6. The combination set forth in claim 1, characterized in that the intermediate portion of said lever which is adapted to be supported on said suspension unit has a seat to make its support more secure.

7. The combination set forth in claim 1, characterized in that the rear end of said lever is shaped to securely engage said wheel-carrying arm.

8. The combination set forth in claim 1, characterized in that the intermediate portion of said lever which is adapted to be supported on said suspension unit has a seat to make its support more secure and has its rear end shaped to securely engage said wheel-carrying arm.

9. In combination with an individual wheel suspension unit of the type provided with two generally parallel pivoted arms, one of which carries the wheel and the other of which is connected to the brake means thereof, said arms having clockwise movement, with consequent dropping of said wheels, upon elevation of their pivots, of a clamping device for preventing such movement of said arms and hence such drop of said wheel, said device comprising a lever adapted to be positioned between said arms with its rear end supportingly engaging said wheel-carrying arm by downward pressure applied to its front end by a pressure screw adjustably carried by said front end and forcibly engaging the pivot portion of said wheel-carrying arm, the intermediate portion of said lever being supported on the pivot portion of the arm connected with the brake means of said wheel.

HOMER R. ROSENBERRY.